May 26, 1925.
H. TEXOON
SQUARING DEVICE FOR CUTS AND FILMS
Filed July 7, 1923  3 Sheets-Sheet 2
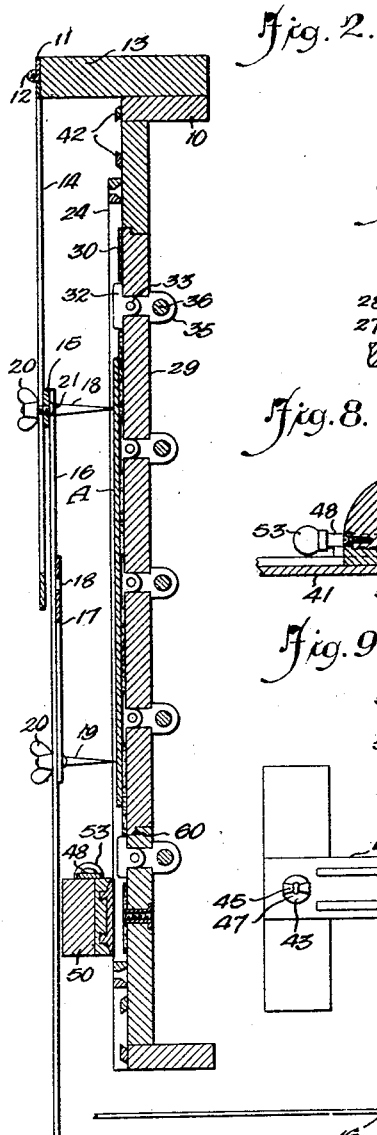
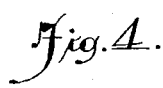
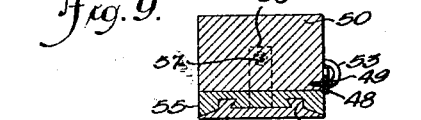
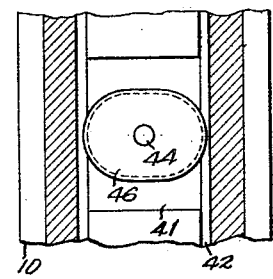
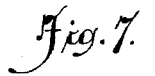
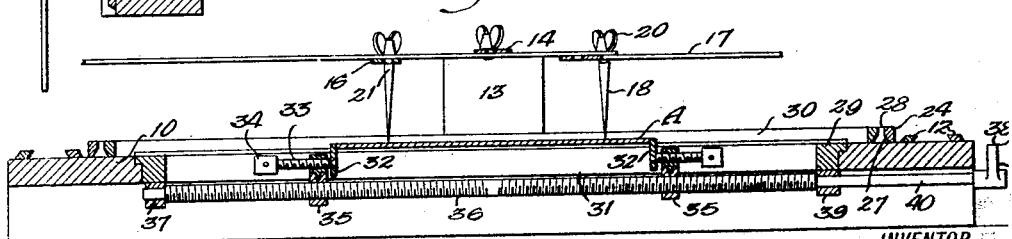
WITNESSES
INVENTOR
HARRY TEXOON
BY
ATTORNEYS May 26, 1925.  1,539,704

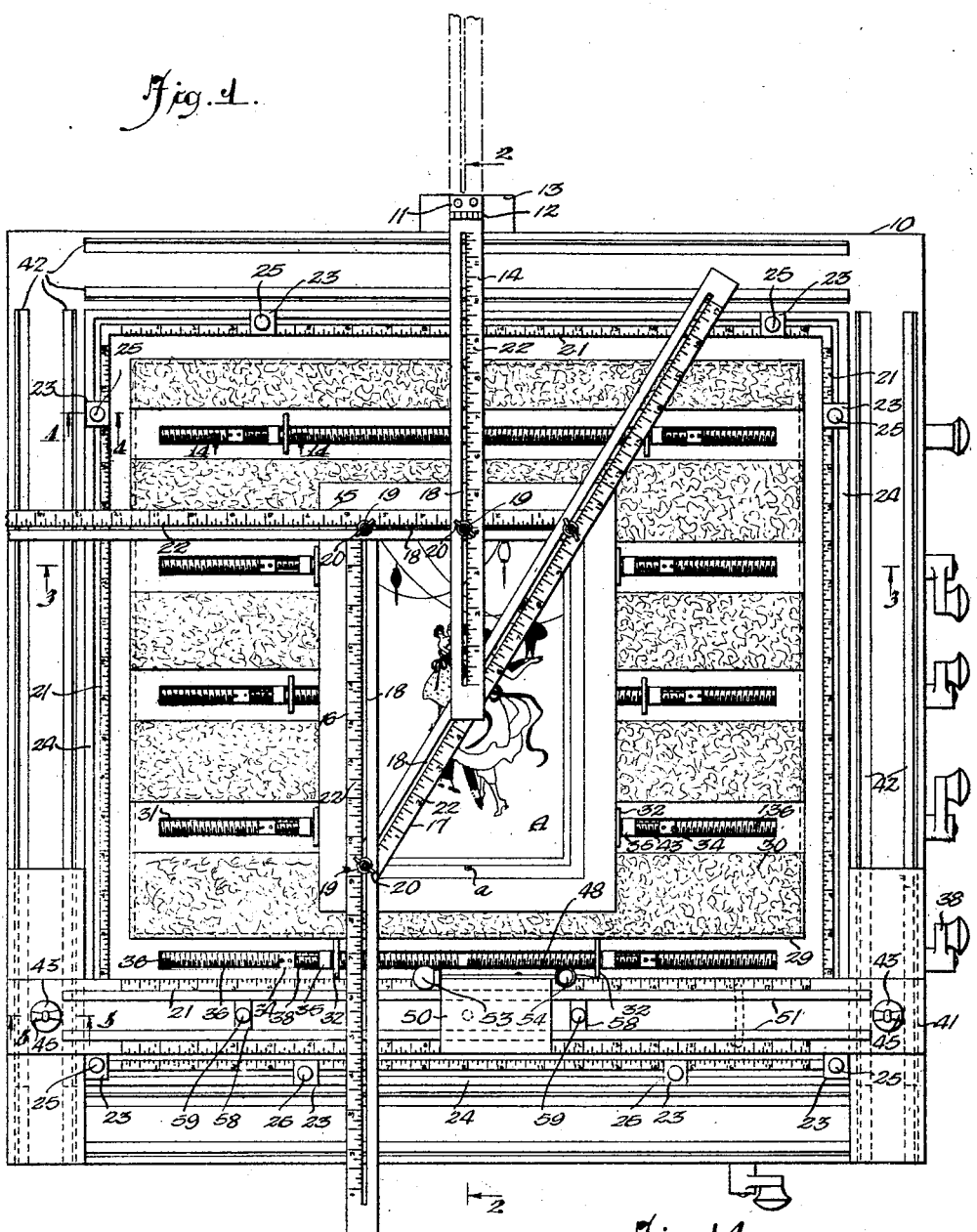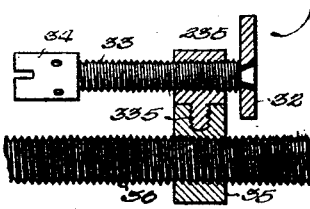

H. TEXOON

SQUARING DEVICE FOR CUTS AND FILMS

Filed July 7, 1923  3 Sheets-Sheet 3

WITNESSES

INVENTOR
HARRY TEXOON
BY
ATTORNEYS

Patented May 26, 1925.

1,539,704

UNITED STATES PATENT OFFICE.

HARRY TEXOON, OF NEW YORK, N. Y.

SQUARING DEVICE FOR CUTS AND FILMS.

Application filed July 7, 1923. Serial No. 650,054.

*To all whom it may concern:*

Be it known that I, HARRY TEXOON, a citizen of the United States of America, and a resident of the city of New York, borough of Manhattan, in the county and State of New York, have invented a new and Improved Squaring Device for Cuts and Films, of which the following is a description.

My invention relates particularly to a device for use in the production of engravings and the like for printing and has for its general object to provide a device that may be employed with facility to accurately square cuts or films.

The device comprises means to accurately center successive cuts or films so that a plurality thereof may be precisely cut to equal size and includes novel means movable to a position to trim the centered cut or film.

The nature of the invention and its distinguishing features and advantages will clearly appear as the description proceeds.

Reference is to be had to the accompanying drawings forming a part of this specification, it being understood that the drawings are merely illustrative of one example of the invention.

Figure 1 is a plan view of a device for the indicated purpose embodying my invention, the device being arranged for squaring cuts;

Figure 2 is a vertical section in the plane indicated by the line 2—2 in Figure 1;

Figure 3 is a vertical section at right angles to Figure 2 as indicated by the line 3—3 in Figure 1;

Figure 10:
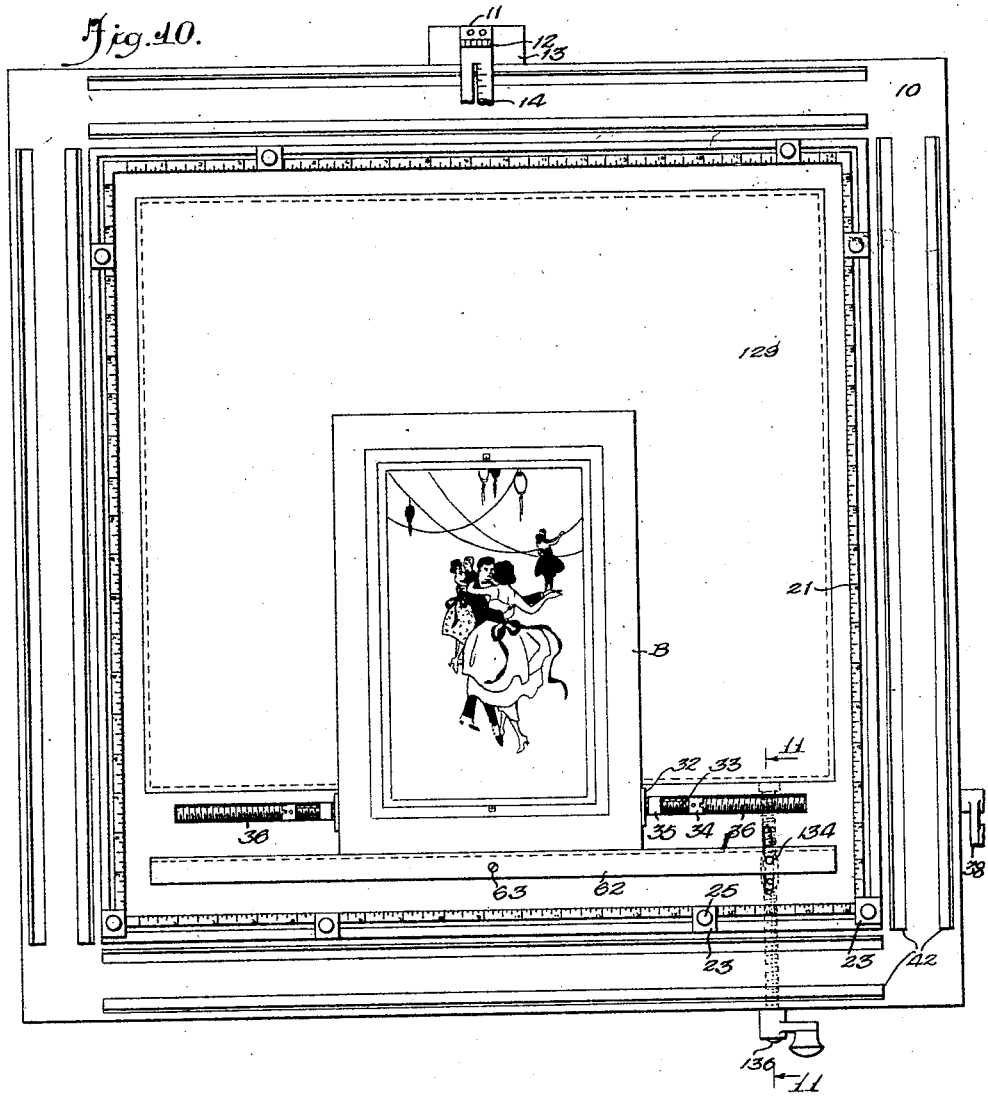
Figure 11:
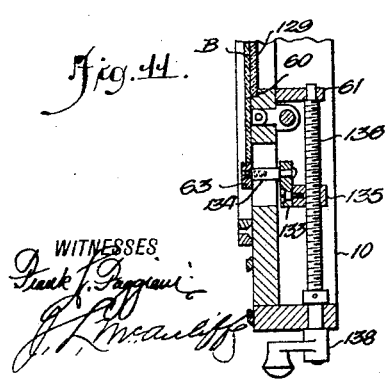
Figure 12:
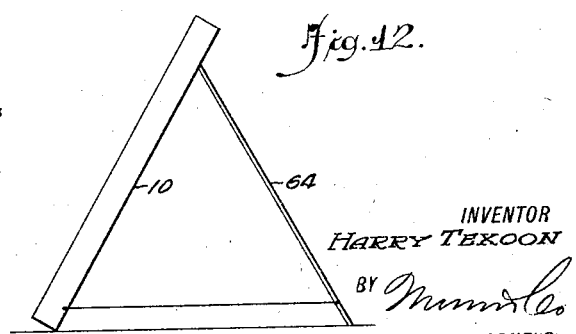

Figures 4 and 5 are details in vertical section respectively on the lines 4—4 and 5—5, Figure 1;

Figure 6 is an inverted view in horizontal section as indicated by the line 6—6, Figure 5;

Figure 7 is a plan view of the T-square forming part of the device and equipped with a cutter;

Figure 8 is a detail of the T-square in longitudinal vertical section as indicated by the line 8—8, Figure 7;

Figure 9 is a transverse vertical section on the line 9—9, Figure 7;

Figure 10 is a plan view similar to Figure 1 but illustrating the use of the device for squaring films;

Figure 11 is a detail in vertical section on the line 11—11, Figure 10;

Figure 12 is a side elevation of the device when set up for use in cutting films;

Figure 13 is a detail in cross section showing the adjustable stops on the T-square hereinafter referred to;

Figure 14 is a detail of one of the clamp assemblages for centering the cut or film.

Referring at first more particularly to the illustrated embodiment of the invention as arranged for centering and trimming cuts, a rectangular frame designated generally by the numeral 10 is provided. A centering device 11 is hinged as at 12 to a block 13 or other fixed part at one side constituting the top of the device. Said centering device for the cut or film includes a bar 14 adapted to be swung to a position imposed on the frame 10 or to a position away from the frame partly indicated by dotted lines in Figure 1.

In addition to the bar 14 a similar bar 15 is disposed at right angles to the bar 14 as well as a third bar 16 extending from the bar 15 beyond and parallel with the bar 14, the arrangement being such that the bars 15 and 16 may be caused to form the base and perpendicular of a right angle triangle. The third side or hypothenuse of the triangle is formed by a bar 17. The several bars 14, 15, 16, 17 are formed with longitudinal slots 18 and a combined fastening means and centering point is provided at the intersections of the several bars. The fastening means comprises a centering pin 19 and a wing nut 20 thereon, each pin having a shoulder 21 lying against the under surface of the lowermost bar so that the nut 20 serves to clamp the bars together.

Near each of the several sides scales 21 are produced on the frame parallel with the side edges and similarly, longitudinal scales 22 are produced on the bars 14, 15, 16 and 17. Gages or stops 23 are provided at the four sides of the frame, two at each side and are adapted to be adjusted relatively to each other along the respective sides in longitudinally slotted guides 24 provided for the purpose. Each stop consists of a top plate through which a screw 25 extends, see Fig. 4, said screw extending also through a conical nut 26 in a dovetail undercut groove 27 formed in the guide 24 and complementary to the longitudinal slot 28 thereof.

Within the guides 24 and scales 21 of the frame 10 a board 29 is supported and adapted to be removed when required, said board having felt strips 30 on the face thereof and transverse slots 31. In the slots 31 clamp heads 32 are disposed, adapted to engage and hold a plate or cut A to be squared. Said clamps 32 are carried in the illustrated example by screws 33 having turning heads 34 and engaging internal threads on travelling blocks or nuts 35 on a right and left screw 36 swivelled at one end in any fixed member 37 of frame 29 and having crank handles 38 or equivalent means at the opposite end for turning the same. An additional bearing 39 is provided for an unthreaded portion of each screw 36. The clamp heads 32 are disposed in pairs, the nuts of a pair engaging respectively the right and left threads of a screw 36 so that the turning of said screw by its handle 38 will cause the nuts 35 and clamp heads 32 to approach or recede from each other. The screws 33 permit of a local adjustment of the heads 32 relatively to the nuts 35. Each nut 35 has a separate top part 235, having screw stud 335 engaging the body of the nut and capable of a slight swivelling movement, the auxiliary adjusting screw 33 being threaded into said top part.

A T-square 41 is provided on the frame 10, said square having a T-head at each end, which may have sliding movement in guides 42 provided at the four sides of the frame outside of the board 29, each head having a clamping device 43 to hold the square in adjusted position. Said clamping device includes a screw 44 having a turning head 45, said screw passing through the square and having a swivelled clamp plate 46 at its lower end and movable in the guide 42. A set nut 47 on the screw of the clamp device 45 completes the fastening of the square 41 in adjusted position relatively to the guides 42. The square 41 carries a cutter 48 pivoted between its ends as at 49 to a block 50 slidable between longitudinal guide ribs 51 on the square. The cutter 52 moves along a side edge of the square 41 to cut along a line determined by the position of the square for severing the plate A along any given line parallel with a side of the frame 10. The cutting edge 52 of the cutter 48 is at one end and the cutter at the opposite end has a balance weight 53 normally tending to maintain the cutter 48 with the cutting edge 52 raised above the top surface of the frame 10. On the cutter 48 near the cutting edge 52 is a finger member 54 which advantageously is in the form of a cup against which the finger may be pressed to force the cutter downwardly for cutting. The block 50 has in practice a wear plate 55 at the under side in sliding contact with the square 41, said wear plate having upturned ends 56 secured by screws 57 to the front and back of said block. The T-square 41 has stops 58 at opposite sides of the block 50 which stops may be adjusted to any positions along the ribs 51 by means of screws 59 passing through said stops and bearing at their lower ends against the surface of the square 41.

To provide the assemblage shown in Figures 10 to 12 the board 29 is removed and a translucent glass 129 is placed in the opening, thereby provided, said board 29 or said glass 129 resting on shoulders or rabbets 60 of frame 10. The glass 129 supports a film B to be squared. The frame is equipped with a screw 136 at right angles to the screws 36. The screw 136 is swivelled at one end on a depending bracket 61 of the frame 10 and has a hand crank 138. The nut 135 carries an arm 133 and a pin 134 is secured to said arm 133 and to a bar 62 pivotally secured as at 63 to the frame 10 against which bar the bottom of the film B is placed. Two screws 36 will usually be sufficient with the bar 62 for holding the film positioned.

With the above described device the cut A or film B is placed on the device and centered by the aid of scales 21 and the centering device designated generally by 11. The triangularly disposed centers 19 are positioned at points on the cut or film along the lines to be severed, the bars 15, 16 and the scales 21 serving to locate the lines required. The plate or film is then held by the screws 36. An arbitrary mark a (Figure 1) is generally found on cuts and films in work of this class and may be used as a guide in centering or positioning the cut or film. By the described arrangement successive cuts or films may be accurately squared to the same size by the use of the T-square 41 and its cutter 48. In working on films the frame 10 is generally supported in an oblique position by an easel or supporting means 64 so that the frame may be placed in front of the light in working on the film.

I would state in conclusion that while the illustrated example constitutes a practical embodiment of my invention, I do not limit myself strictly to the exact details herein illustrated, since, manifestly, the same can be considerably varied without departure from the spirit of the invention as defined in the appended claims.

Having thus described my invention, I claim:

1. A squaring device for cuts or films, comprising a frame having means to support a cut or film thereon and having scales at right angles to each other, a square, and guides for the square disposed at right angles to each other for positioning the square on said frame and at different sides of the cut or film, and cutting means carried by the square and movable along one arm thereof.

2. A squaring device for cuts or films, comprising a frame having means to support a cut or film thereon and having scales at right angles to each other, and a centering device having centering pins disposed on lines forming a triangular figure; together with a square, guides for the square disposed at right angles to each other for positioning the square at different sides of the cut or film, and cutting means carried by the square and movable along one of the arms thereof.

3. A squaring device for cuts or films, comprising a frame having means to support a cut or film thereon, means associated with said frame to accurately position the cut or film, and means to hold the cut or film in position and variable to accommodate cuts or films of different sizes; together with cutting means movable on the frame, and means for variously guiding the movement of said cutting means to sever the cut or film at the respective sides thereof.

4. A squaring device for cuts or films, comprising a frame having means to support a cut or film thereon, and means on and swingable over the frame to a position disposed on the cut or film in the frame or to a position away from the frame, said swingable means having members for centering and positioning the cut or film in the frame; together with means additional to said swingable means movably supported in the frame and adapted to engage a positioned cut or film to thereby determine the location of successive cuts or films in positioning the same in the frame.

5. A squaring device for cuts or films, comprising a frame having means to support a cut or film thereon, centering means to position the cut or film in the frame, elements adjustable on the frame to accord with the positioned cut or film for thereby correspondingly centering successive cuts or films in the same position, cutting means and movable carrying means for the cutting means adapted for movement over the frame on lines at right angles to each other for squaring the respective sides of the cut or film.

6. In a squaring device for cuts or films comprising a frame having means to support a cut or film thereon, and centering means to determine the correct positioning of the cut or film to be squared, said second-mentioned means comprising a bar adjustably connected with said frame, a second bar secured to said frame and disposed transverse to the first bar at right angles thereto and adjustably connected therewith, a third bar adjustably connected at one end with the second-mentioned bar and disposed parallel with the first bar as well as extending beyond the same said third bar adjustably connected with said frame, and an oblique bar adjustably connecting the second-mentioned bar near an end thereof with the third-mentioned bar and itself adjustably connected with said frame, said bars carrying centering members.

7. In a squaring device for cuts or films comprising a frame having means to support a cut or film thereon, and centering means to determine the correct positioning of the cut or film to be squared, said second-mentioned means comprising a bar adjustably connected with said frame, a second bar secured to said frame and disposed transverse to the first bar at right angles thereto and adjustably connected therewith, a third bar adjustably connected at one end with the second-mentioned bar and disposed parallel with the first bar as well as extending beyond the same said third bar adjustably connected with said frame, and an oblique bar adjustably connecting the second-mentioned bar near an end thereof with the third-mentioned bar and itself adjustably connected with said frame, said bars carrying centering members, said several bars having longitudinal scales thereon.

8. In a squaring device for cuts or films comprising a frame having means to support a cut or film thereon, and centering means to determine the correct positioning of the cut or film to be squared, said second-mentioned means comprising a bar adjustably connected with said frame, a second bar secured to said frame and disposed transverse to the first bar at right angles thereto and adjustably connected therewith, a third bar adjustably connected at one end with the second-mentioned bar and disposed parallel with the first bar as well as extending beyond the same said third bar adjustably connected with said frame, and an oblique bar adjustably connecting the second-mentioned bar near an end thereof with the third-mentioned bar and itself adjustably connected with said frame, said bars carrying centering members, said several bars having longitudinal scales thereon, and the said frame having scales adjacent to the four sides thereof.

9. In a squaring device for cuts or films comprising a frame having means to support a cut or film thereon, and centering means to determine the correct positioning of the cut or film to be squared, said second-mentioned means comprising a bar adjustably connected with said frame, a second bar secured to said frame and disposed transverse to the first bar at right angles thereto and adjustably connected therewith, a third bar adjustably connected at one end with the second-mentioned bar and disposed parallel with the first bar as well as extending beyond the same said third bar adjustably connected with said frame, and an oblique bar adjustably connecting the second-mentioned bar near an end thereof with the third-mentioned bar and itself adjustably connected with said frame, said bars carrying centering members, said several bars having longitudinal scales thereon; together with cutting means, and means to guide the cutting means over the frame on lines at right angles to each other.

10. In a device of the class described, a frame adapted to receive a cut or film, centering means mounted on said frame for determining the position of the cut or film, holding means secured to and adjustable over the frame to conform to various sizes of cuts or films to thereby determine the position of successive cuts or films after one cut or film has been centered and positioned, and cutting means on the frame and movable over the same and comprising a cutter adjustably mounted to position the same for cutting a cut or film of a given size.

11. A squaring device for cuts or films, comprising a frame, a support adapted for a cut or film, said support removably held in the frame, means on the frame to center a cut or film on said support, cutting means disposed on the frame, and means carrying on the frame and the cutting means and positionable on the frame to have movement over said support on lines at right angles to each other

HARRY TEXOON.